358-190. OR 3,798,369 SR

United States Patent [19]

Dietch

[11] 3,798,369

[45] Mar. 19, 1974

[54] INSTANT PLAY TELEVISION RECEIVER WITH CONSTANT VOLTAGE TRANSFORMER

[75] Inventor: Leonard Dietch, Skokie, Ill.

[73] Assignee: Zenith Radio Corporation, Chicago, Ill.

[22] Filed: May 22, 1972

[21] Appl. No.: 255,350

[52] U.S. Cl........ 178/7.5 R, 178/DIG. 11, 315/105, 328/270

[51] Int. Cl. ............................................ H04n 5/44

[58] Field of Search...... 187/7.5 R, DIG. 11, 7.3 R; 315/94, 105, 101; 328/270, 258, 260; 307/157, 150; 325/492–495, 39 D, 392, 393

[56] References Cited

UNITED STATES PATENTS

| | | | |
|---|---|---|---|
| 2,428,008 | 9/1947 | Brakel et al. | 315/105 |
| 3,373,364 | 3/1968 | Tumarkin et al. | 315/94 |
| 3,496,446 | 2/1970 | Griffey | 315/101 |
| 3,603,732 | 9/1971 | George | 178/7.5 R |

*Primary Examiner*—Howard W. Britton
*Assistant Examiner*—George G. Stellar
*Attorney, Agent, or Firm*—Nicholas A. Camasto

[57] ABSTRACT

A solid state television receiver incorporates a voltage regulating transformer having a filament winding supplying substantially constant operating voltage to the picture tube filament for prolonging picture tube life. Instant play operation is achieved by providing a filament transformer having a high impedance primary winding, connectable in series with the input of the regulating transformer, and a secondary winding connected in series with the regulating transformer filament winding. The single pole, single throw on-off switch of the receiver is connected across the primary winding of the filament transformer. When the switch is open, the regulating transformer input and the primary of the filament transformer are in series with substantially reduces the voltage across the regulating transformer primary and drops the secondary voltages below operating levels for the television receiver. The filament transformer secondary winding supplies the tube filament with reduced power during standby operation.

7 Claims, 1 Drawing Figure

T5117
Rn

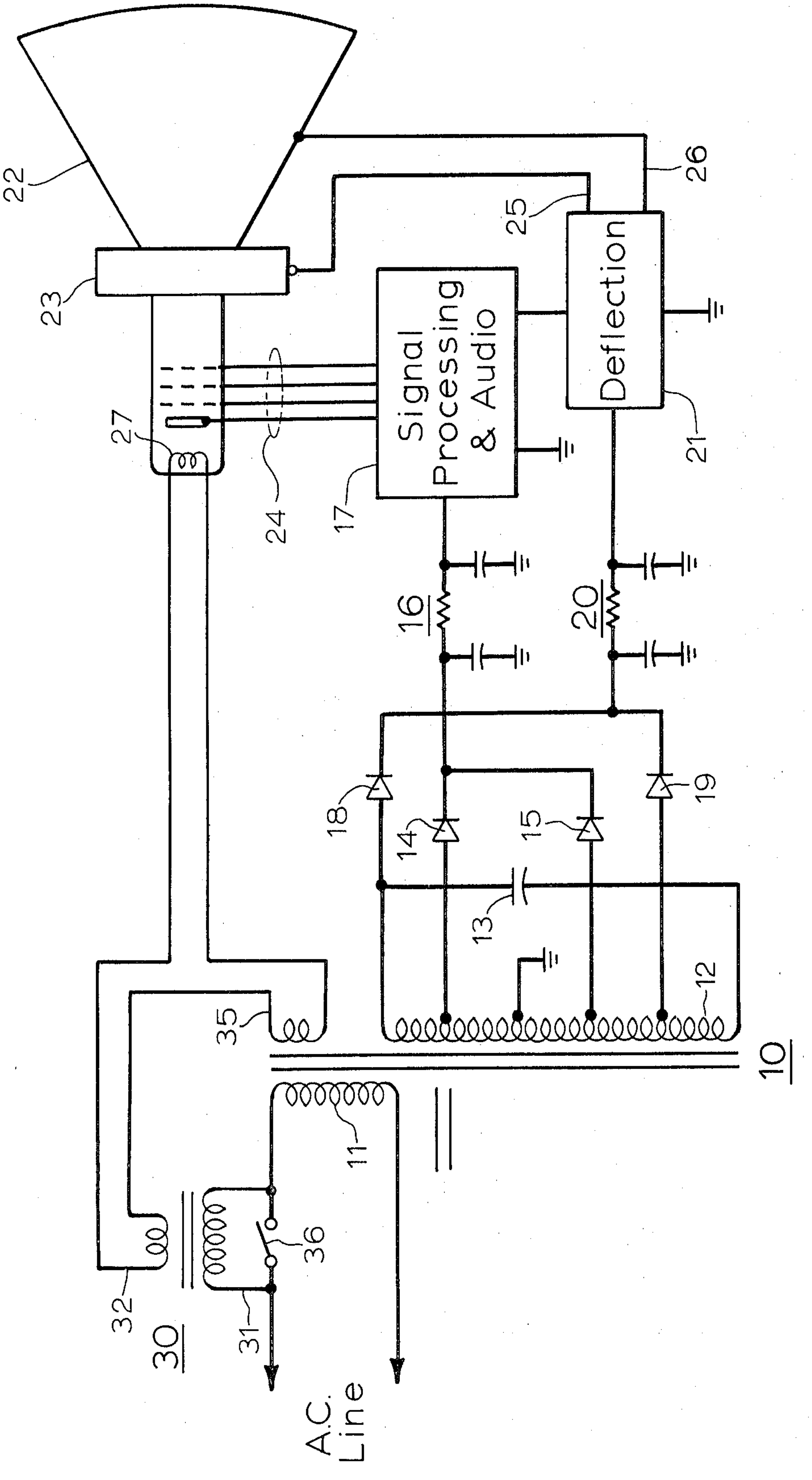
Signal Processing & Audio
Deflection
A.C. Line
10
11
12
13
14
15
16
17
18
19
20
21
22
23
24
25
26
27
30
31
32
35
36

INSTANT PLAY TELEVISION RECEIVER WITH CONSTANT VOLTAGE TRANSFORMER

RELATED APPLICATIONS

This application is related to application Ser. No. 257,327, filed May 26, 1972 entitled "AUTOMATIC DEGAUSSING IN A TELEVISION RECEIVER WITH CONSTANT VOLTAGE TRANSFORMER" in the name of Hans E. Manske and application Ser. No. 312,146, filed Dec. 4, 1972 entitled "SOLID-STATE TELEVISION RECEIVER WITH MAGNETICALLY REGULATED POWER SUPPLY" in the name of Hans E. Manske, both assigned to the assignee of the present invention.

BACKGROUND OF THE INVENTION

Television receivers are being designed almost exclusively with solid state circuitry, that is, circuits employing semi-conductors rather than vacuum tubes. The benefits of solid state circuits are numerous and obvious and include economy in operating power, reliability and compactness. Another design trend is directed toward instantaneous operation of the receiver when the on-off switch is actuated. This feature is generally referred to as "instant play" and this term will be used in the following discussion. In an all solid state receiver, instant play operation is automatically available with the exception of the picture tube filament which requires standby power to keep it warm.

Generally speaking, instant play is obtainable in a conventional television receiver having a power transformer by providing a tap on the primary winding of the transformer. The on-off switch for the receiver is arranged to change the number of active turns on the primary winding and thus determine the magnitude of the secondary voltages generated. In the off condition, for example, the switch connects a larger number of primary turns across the input supply, thus effectively decreasing the voltage per turn, resulting in a decrease in secondary voltages. All secondary windings, including the filament winding for the picture tube, are affected and a lower potential for operation of the tube in the standby mode is supplied. A separate switch element is incorporated to open the B+ circuits. When the receiver is turned on, the switch connects fewer primary turns to the source resulting in a higher (normal) voltage per turn and correspondingly higher secondary potentials for normal operation and restores the B+ circuits.

Another instant play approach uses a separate filament transformer for standby operation, which is energizable by means of a separate switch. The switch is operable simultaneously with the receiver on-off switch interrupts power to the main transformer, so that the separate filament transformer energizes the picture tube filament at reduced power when the television receiver is off.

Yet another arrangement provides a separate continuously operating filament transformer for delivering the standby portion of the filament voltage. In this arrangement, the secondary of the filament transformer is connected in series with a small filament winding on the power transformer. During normal operation, the voltages add for full filament power delivery. During standby, the main transformer is disabled and its filament secondary appears as a small resistance in series with the picture tube filament.

It is also very advantageous to keep the receiver on-off switch as simple as possible. Maximum economy and reliability are, of course, attained with a single pole, single throw type switch. The benefits of such a simple switch are greatly enhanced if the receiver is to include provision for operation from remote points. In these situations, the on-off switching arrangement must be parallelled by a similar arrangement and a single pole, single throw unit is certainly preferred.

In the television receiver of the invention, a constant voltage regulating transformer is used to supply receiver operating potentials. Aside from the obvious benefits to the receiver circuitry, a great advantage in picture tube longevity is attained by supplying the filament with constant power during operating periods. Further, the receiver incorporates an instant play feature, using a separate, but interconnected, filament transformer and requires only a single pole, single throw switch to accomplish the changeover.

Accordingly, a general object of this invention is to provide an improved instant play television receiver.

Another object of this invention is to provide an instant play television receiver with improved picture tube life capability.

A specific object of the invention is to provide a novel instant play television receiver incorporating a voltage regulating transformer for improved tube life.

SUMMARY OF THE INVENTION

In accordance with the invention, a television receiver includes a voltage regulating transformer capable of maintaining substantially constant output voltages over a wide range of input voltage variation. The transformer incorporates a filament winding supplying constant operating potential to the picture tube which contributes to extended picture tube life. The receiver includes means changing the operating characteristics of the regulating transformer during receiver off periods to reduce its output to disable the receiver and for maintaining partial energization of the picture tube filament for instant play.

BRIEF DESCRIPTION OF THE DRAWING

The invention will best be understood by reading the following specification in conjunction with the drawing in which a partial schematic diagram of a television receiver incorporating the invention is shown.

DESCRIPTION OF THE PREFERRED EMBODIMENT

Referring to the drawing, a constant voltage regulating transformer 10 includes a primary winding 11 and a tapped secondary winding 12. A capacitor 13 is coupled across secondary winding 12 for resonating the secondary magnetic path at approximately 60 Hz. A pair of rectifiers 14 and 15 are connected across a portion of secondary winding 12 and feed a conentional filter network 16. The output of filter network 16 presents a DC voltage of a given magnitude which is used for powering block 17 labelled SIGNAL PROCESSING AND AUDIO. It will be understood that block 17 preferably incorporates solid state circuitry for receiving transmitted television signals, demodulating these signals to recover the video, audio and control information and properly processing the recovered information to reproduce the audio accompaniment, convey necessary control information to block 21 labelled DEFLECTION and, via a plurality of leads 24, convey the video information to a picture tube 22. In this embodiment the receiver is not indicated as being of any particular type, it being apparent that the receiver may be monochrome or color.

Another pair of rectifiers 18 and 19 are connected across a larger portion of secondary winding 12 and feed a filter network 20 for developing a DC potential of higher magnitude for driving the circuitry in block 21, labelled DEFLECTION, which also preferably is of solid state construction. A common ground tap on winding 12 provides a return for both DC supplies. One output lead 25 of block 21 drives a yoke 23 mounted on the neck of picture tube 22. It will be understood that portrayal of a single output lead 25 is representative only; in actuality, lead 25 comprises a number of conductors for delivering horizontal and vertical scanning voltages to yoke 23. Block 21 may also include circuitry for developing a high unidirectional voltage for application to the picture tube via a high voltage output lead 26.

Picture tube 22 has a filament 27 which is normally supplied power from another secondary winding 35 on transformer 10 which is connected in series with a secondary winding 32 of a separate filament transformer 30. The primary winding 31 of filament transformer 30 is connectable in series with primary winding 11 by means of a switch 36. Depending upon the position of switch 36, primary winding 31 of the filament transformer will either be energized in series with primary 11 of transformer 10 or shorted out.

The following operational description assumes switch 36 is closed, which position corresponds to the on condition of the television receiver. Under these conditions, primary winding 11 is energized with the full voltage from the AC line (nominally 120 volts AC) and transformer 10 operates in its normal voltage regulating mode. As indicated by the horizontal and vertical lines schematically representing the core structure, regulating transformer 10 comprises a primary magnetic path loosely coupled to a secondary magnetic path. The short horizontal lines represent the shunting core about the primary responsible for the poor or "loose" primary to secondary coupling. The secondary winding is resonated at line frequency (60 Hz) by a capacitor 13 which, in a typical construction, approximates 4 microfarads. By making the secondary resonant, its core structure is driven into saturation with the result that the secondary output voltages are not sinewaves but square waves. A further, and more important, effect is that the output voltages remain substantially constant irrespective of wide variations in the applied voltage across primary winding 11. The DC voltages developed across filters 16 and 20 are extremely well regulated and contribute to enhanced operation and long term reliability of the television receiver.

More important benefits arising from a constant voltage are experienced by the picture tube. In practice, the voltage developed across secondary winding 35 of the regulating transformer is about 6.8 volts rms. Since winding 35 is in series with secondary winding 32 of filament transformer 30 (the primary of which is shorted by switch 36) a voltage drop of approximately 0.8 volts is experienced and picture tube filament 26 is supplied with 6.0±0.2 volts rms. Thus the picture tube filament experiences substantially constant voltage during operational periods which is highly conducive to long life. The regulating transformer also has the noteworthy characteristic of reducing the amplitude and duration of any line voltage transients, which contributes materially to the reliability and performance of the entire receiver.

When switch 36 is opened, corresponding to the standby condition of the television receiver, primary winding 31 of filament transformer 30 is connected in series with primary winding 11 of the regulating transformer. The primary winding of the filament transformer has a much higher impedance than winding 11 and, consequently, substantially all of the input voltage drop occurs across winding 31. The voltage across winding 11 is about 4 volts rms, which is insignificant. Under these conditions, secondary winding 32 develops approximately 5.2 volts rms and supplies filament 26 in series with secondary winding 35. Because of the low voltage across primary 11, the regulating transformer is for all practical purposes disabled and a very nominal voltage is developed across secondary winding 12, on the order of magnitude of 4 volts rms. The picture tube filament experiences approximately 4.8 volts rms in the standby condition which, while sufficient to keep the cathode warm for instant play operation, is not enough to result in deterioration of the cathode material. During standby, the filament is powered from an unregulated source, but this is of no consequence to tube life because no anode current flows. Closure of switch 36 shorts out primary winding 31 and results in winding 11 being operated at full line potential with consequent development of all normal secondary voltages as indicated above and substantially instantaneous operation of the television receiver.

It will thus be seen that an instant play circuit is provided for a television receiver incorporating a voltage regulating transformer which supplies regulated voltage to the picture tube filament. The inventive circuitry described accomplishes the above in a receiver having a simple single pole, single throw on-off switch which contributes markedly to extreme reliability and inclusion of remote control features in a very simple, economical manner.

While particular embodiments of the invention have been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

What is claimed is:

1. A television receiver including; a picture tube having a plurality of electrodes and a filament; signal processing means supplying to said picture tube electrodes voltages for reproducing a transmitted television scene; a regulating transformer having an input winding generating flux in a primary magnetic path and a plurality of output windings linking flux in a secondary magnetic path, said regulating transformer supplying substantially constant operating potentials to said signal processing means and to said filament over a wide range of input winding voltage variation; and instant play means maintaining said filament partially energized during receiver inoperative periods, said instant play means including a filament transformer in circuit with said input winding for maintaining said filament partially energized during receiver inoperative periods and simultaneously changing the operating characteristics of said regulating transformer to reduce its output substantially below the level at which said signal processing circuit means are disabled.

2. In a television reciver as set forth in claim 1 wherein said instant play means comprises a single pole, single throw on-off switch and wherein said circuit means comprises a filament transformer having a primary winding serially connected with said input winding and a secondary winding serially connected between one of said output windings and said filament, said switch being arranged to short said primary winding to turn the television receiver on.

3. In a television receiver as set forth in claim 2 wherein the impedance of said primary winding is substantially greater than the impedance of said input winding and wherein said secondary winding and said one output winding alternately supply voltage to said filament in accordance with the position of said switch.

4. A television receiver including: a picture tube having a filament; signal processing means including raster producing means, coupled to said picture tube, supplying control and signal information for producing thereon a television scene; a regulating transformer having a primary magnetic path and a resonant secondary magnetic path; a filament winding linking said secondary magnetic path and coupled to said filament, said regulating transformer maintaining substantially constant flux density in said secondary magnetic path and supplying substantially constant voltages to said filament and said signal processing means despite variations in input voltage; and instant play means maintaining said filament partially energized during receiver inoperative periods comprising, a normally disabled filament transformer in circuit with both said regulating transformer and said filament, and a switch enabling said filament transformer for simultaneously supplying reduced voltage to said filament and changing the operating characteristic of said regulating transformer to reduce its output voltages below the level at which said signal processing means are disabled.

5. A television receiver as set forth in claim 4 wherein said filament transformer has a secondary winding serially connected with said filament winding and a primary winding serially connectable in series with the input of said regulating transformer, the impedance of said primary winding being substantially higher than the impedance of said input winding.

6. A television receiver as set forth in claim 5 wherein said switch comprises a single pole, single throw receiver on-off switch connected across the primary winding of said filament transformer, said switch being open and allowing energization of said primary winding when said receiver is in an inoperative state and shorting out said primary winding when said receiver is operative.

7. A television receiver as set forth in claim 6 wherein said secondary winding generates substantially the entire voltage for maintaining said filament partially energized and said filament winding generates substantially the entire voltage for normal operation of said filament, said windings being alternately energized by operation of said switch.

* * * * *